United States Patent
Jiang et al.

(10) Patent No.: US 10,212,723 B2
(45) Date of Patent: Feb. 19, 2019

(54) USER PAIRING METHOD, DEVICE AND SYSTEM FOR REALIZING USER SCHEDULING

(71) Applicant: Huawei Technologies Co., Ltd., Shenzhen, Guangdong (CN)

(72) Inventors: Wei Jiang, Shenzhen (CN); Yi Wang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 891 days.

(21) Appl. No.: 14/524,447

(22) Filed: Oct. 27, 2014

(65) Prior Publication Data
US 2015/0043525 A1    Feb. 12, 2015

Related U.S. Application Data

(63) Continuation of application No. PCT/CN2012/085235, filed on Nov. 26, 2012.

(30) Foreign Application Priority Data

Apr. 27, 2012  (CN) .......................... 2012 1 0129072

(51) Int. Cl.
H04W 72/12    (2009.01)
H04W 48/12    (2009.01)
(Continued)

(52) U.S. Cl.
CPC ...... H04W 72/1226 (2013.01); H04B 7/0452 (2013.01); H04J 11/0079 (2013.01);
(Continued)

(58) Field of Classification Search
CPC .... H04L 67/104; H04W 4/005; H04W 48/12; H04B 7/0456; H04J 11/0079; H04N 21/6131
See application file for complete search history.

(56) References Cited

U.S. PATENT DOCUMENTS

2010/0217874 A1* 8/2010 Anantharaman ..........................
................................................................. H04L 29/12528
................................................................. 709/228
2011/0249713 A1* 10/2011 Hammarwall ....... H04B 7/0634
................................................................. 375/220
(Continued)

FOREIGN PATENT DOCUMENTS

CN    101383645 A    3/2009
CN    101540746 A    9/2009
(Continued)

OTHER PUBLICATIONS

R1-094242, "Investigation on Enhanced DL-MU-MIMO Processing Based on Channel Vector Quantization for LTE-Advance", Oct. 12-16, 2009.*
(Continued)

Primary Examiner — Salvador E Rivas
(74) Attorney, Agent, or Firm — Leydig, Voit & Mayer, Ltd.

(57) ABSTRACT

Embodiments of the present invention disclose a user pairing method, a device and a system for realizing user scheduling. The method comprises: determining a first user of a time-frequency resource according to a preset resource allocation criterion; searching a preset pairing table according to a downlink channel state quantization code of the first user; and obtaining a paired downlink channel state quantization code which is paired with the downlink channel state quantization code of the first user, wherein the preset pairing table includes a pairing relationship among the downlink channel state quantization codes obtained by pre-calculating; identifying a paired user of the first user from users to be paired, wherein a downlink channel state quantization code of the paired user is the same as the paired downlink channel state quantization code. Through adopting
(Continued)

of the present invention, complexity of real-time calculation of pairing during user scheduling can be lowered.

4 Claims, 8 Drawing Sheets

(51) Int. Cl.
    *H04N 21/61*     (2011.01)
    *H04J 11/00*     (2006.01)
    *H04L 5/00*     (2006.01)
    *H04B 7/0452*     (2017.01)

(52) U.S. Cl.
    CPC .......... *H04L 5/0005* (2013.01); *H04L 5/0037* (2013.01); *H04N 21/6131* (2013.01); *H04W 48/12* (2013.01)

(56) References Cited

U.S. PATENT DOCUMENTS

2011/0306384 A1* 12/2011 Wei ...................... H04B 7/0617
                                                                   455/522
2012/0236817 A1     9/2012 Chen et al.

FOREIGN PATENT DOCUMENTS

| CN | 101667896 A | 3/2010 |
| --- | --- | --- |
| CN | 101695008 A | 4/2010 |
| CN | 101777965 A | 7/2010 |
| CN | 101867965 A | 10/2010 |
| CN | 101931498 A | 12/2010 |
| EP | 2346189 A1 | 7/2011 |

OTHER PUBLICATIONS

R1-094242, "Investigation on Enhanced DL-MU-MIMO Processing Based on Channel Vector Quantization for LTE-Advance", Oct. 12-16, 2009 (Year: 2009).*

"Investigation on Enhanced DL MU-MIMO Processing Based on Channel Vector Quantization for LTE-Advanced," 3GPP TSG RAN WG1 Meeting #58bis, Miyazaki, Japan, R1-094242, $3^{rd}$ Generation Partnership Project, Valbonne, France (Oct. 12-16, 2009).

* cited by examiner

USER PAIRING METHOD, DEVICE AND SYSTEM FOR REALIZING USER SCHEDULING

CROSS-REFERENCE TO RELATED APPLICATIONS

This application is a continuation of International Patent Application No. PCT/CN2012/085235, filed Nov. 26, 2012, which claims priority to Chinese Patent Application No. 201210129072.7, filed Apr. 27, 2012, both of which are hereby incorporated by reference in their entireties.

TECHNICAL FIELD

The present invention relates to a field of wireless communications, and particularly, to a user pairing method, device and system for realizing user scheduling.

BACKGROUND

In a wireless communication system, resource (including time, frequency, space, power and the like) allocation plays a key role in a system performance. The first-generation and second-generation mobile communication systems are generally narrowband systems, and a multi-user gain may be acquired by scheduling different users in their corresponding time slots with higher channel gains. However, since a wireless system is generally a slow fading system, time domain scheduling is in limited gains. The third-generation mobile communication system is a broadband system with stronger frequency-selective fading, and a multi-user gain is obvious as a network side may schedule users in a two-dimension: time and frequency. For example, in an LTE (Long Term Evolution) system, a system capacity and performance are greatly increased through allocating a physical resource block by a channel-dependent scheduling technology.

A multiple input multiple output (MIMO) system is capable of, using a plurality of physical antennas on a transmitter and a receiver, linearly increasing, on the premise of not increasing spectral and power resources, a multipath fading channel capacity with the number of receiving and transmitting antennas (specifically, the minimum number of receiving or transmitting antennas), which becomes a revolutionary technology for increasing spectral efficiency. In a complex reflection environment, a channel matrix may be considered to be a full rank matrix. Through performing precoding (such as V-BLAST, D-BLAST and the like) in a transmitter or performing signal detection (such as ML, MMSE, ZF and the like) in a receiver, crosstalk among antennas may be eliminated to form multiple parallel independent sub-channels, and the total channel capacity is the sum of the channel capacities of all the sub-channels, thus breaking the limitation that the channel capacities are only logarithmically increased with power, thereby increasing the degree of spatial freedom.

The above-mentioned MIMO system only aims at a single user, a characteristic of uncorrelation of channel fading among antennas may not be always satisfied as a physical distance among array elements of array antennas is subject to many limitations, and thereby a channel capacity will be influenced. Moreover, it is not suitable to configure too many antennas as the size, cost, power consumption and the like of a user terminal are limited, and it's difficult to obtain higher capacity and performance gain on a single-user MIMO. Therefore, a multi-user MIMO (MU-MIMO) becomes an inevitable choice for further improving the performance. In an MU-MIMO system, data of a plurality of users may be spatially multiplexed on a same time frequency resource by an SDMA (Spatial Division Multiple Access) technology. However, the number of the users one time frequency resource can support is far less than the number of users need to perform transmitting, and since the channel fading of different user equipment (UE) is different from each other, the capacities and performances acquired by the different user equipment by transmitting on the same time frequency resource are entirely different. Therefore, suitable users may be selected from the users need to perform transmitting, in order to perform a user pairing, which perform data transmission on the time frequency resource jointly to acquire a multi-user gain, thus increasing the spectral efficiency of the system.

User scheduling is mostly performed by a greedy algorithm in an existing MU-MIMO system. The Greedy algorithm requires a base station, after obtaining instantaneous channel state information of users, directly calculates out, by virtue of a current channel vector of each user, a pairing relationship ensuring the best system performance, thus finding out a most suitable pairing user to perform pairing. Since pairing calculations need to be performed on channel vectors of other users according to a pairing criterion when a first user is selected, it may cost large amount of calculation and the calculation may be complex. Moreover, since a channel fading changes rapidly and randomly, once a large delay is caused due to the large amount of calculation, a system performance will be highly influenced.

SUMMARY

The present invention provides a user pairing method, device and system for realizing user scheduling, which are capable of reducing the complexity of a real-time calculation of pairing during user scheduling, and improving a system performance.

In order to solve an above-mentioned technical problem, on one hand, an embodiment of the present invention provide a user pairing method for realizing user scheduling, including:

determining a first user of a time-frequency resources according to a preset resource allocation criterion;

searching a preset pairing table according to a downlink channel state quantization code of the first user to obtain a paired downlink channel state quantization code which is paired with the downlink channel state quantization code of the first user, wherein the preset pairing table includes a pairing relationship among downlink channel state quantization codes obtained by pre-calculating; and determining a paired user of the first user from users to be paired, wherein a downlink channel state quantization codes of the paired user is the same as the paired downlink channel state quantization code.

On another hand, an embodiment of the present invention further provide a method for obtaining a downlink channel state quantization code, including:

obtaining a downlink channel state information through a downlink channel estimation; and searching a quantization code matching the downlink channel state information from a preset quantization code table according to a preset quantization criterion.

On another hand, an embodiment of the present invention further provide a user pairing device for realizing user scheduling, including:

a resource allocating module, configured to determine a first user of a time-frequency resource according to a preset resource allocation criterion;

a pairing table searching module, configured to search a preset pairing table according to a downlink channel state quantization code of the first user to obtain a paired downlink channel state quantization code which is paired with the downlink channel state quantization code of the first user, wherein the preset pairing table includes a pairing relationship among downlink channel state quantization codes obtained by pre-calculating; and a pairing module, configured to determine a paired user of the first user from users to be paired, wherein a downlink channel state quantization code of the paired user is the same as the paired downlink channel state quantization code.

On another hand, an embodiment of the present invention further provide a base station, including an above-mentioned user pairing device for realizing user scheduling.

On another hand, an embodiment of the present invention further provide a device for obtaining a downlink channel state quantization code, including:

a downlink channel state information obtaining module, configured to obtain downlink channel state information through a downlink channel estimation; and a downlink channel state quantization code identifying module, configured to search a quantization code matching the downlink channel state information by searching a preset quantization code table according to a preset quantization criterion.

On another hand, an embodiment of the present invention further provide a user pairing system for realizing user scheduling, including a plurality of terminals and a base station, wherein:

the terminals are configured to: send downlink channel state quantization codes to the base station, wherein the downlink channel state quantization codes are quantization codes matching the downlink channel state information, which are searched out from a preset quantization code table according to a preset quantization criterion after the downlink channel state information is obtained by the terminals through downlink channel estimations; and the base station is configured to: determine a first user of a time-frequency resource according to a preset resource allocation criterion; receive the downlink channel state quantization codes sent by the terminals; determine the downlink channel state quantization codes of the first user from the received downlink channel state quantization codes; search a preset pairing table according to the downlink channel state quantization code of the first user to obtain a pairing downlink channel state quantization code which is paired with the downlink channel state quantization code of the first user, wherein the preset pairing table includes a pairing relationship among downlink channel state quantization codes obtained by pre-calculating; and determine a paired user of the first user from users to be paired, wherein the downlink channel state quantization code of the paired user is the same as the paired downlink channel state quantization code.

On another hand, an embodiment of the present invention further provide a user pairing system for realizing user scheduling, including a plurality of terminals and a base station, wherein:

the terminals are configured to: sent downlink channel state information to the base station, wherein the downlink channel state information is a downlink space vector used for representing a downlink channel state; and the base station is configured to: determine a first user of a time-frequency resource according to a preset resource allocation criterion; receive the downlink channel state information sent by the terminals; search quantization codes matching the obtained downlink channel state information from a preset quantization code table according to a preset quantization criterion; determine the matched quantization codes to be downlink channel state quantization codes corresponding to the downlink channel state information; identify the downlink channel state quantization code of the first user from the downlink channel state quantization codes; search a preset pairing table according to the downlink channel state quantization code of the first user to obtain a paired downlink channel state quantization code which is paired with the downlink channel state quantization codes of the first user, wherein the preset pairing table includes a pairing relationship among downlink channel state quantization codes obtained by pre-calculating; and determine a paired user of the first user from users to be paired, wherein a downlink channel state quantization code of the paired user is the same as the paired downlink channel state quantization code.

It can be seen that, through presetting a pairing table including a pairing relationship among downlink channel state quantization codes, and then selecting a paired user paired with the first user for each time-frequency resource in the pairing table according to an instantaneous downlink channel state quantization code, an embodiment of the present invention can reduce a complexity and calculation amount of a real-time calculation, reduce a time delay, and improve a performance of the communication system.

BRIEF DESCRIPTION OF DRAWINGS

In order to illustrate the technical solution in the embodiments of the present invention or the prior art more clearly, drawings which are needed in descriptions of the embodiments or the prior art will be simply introduced below. Obviously, the drawings in the descriptions below are merely part of embodiments of the present invention, based on which other drawings may also be obtained by those of ordinary skill in the art without any creative effort.

DESCRIPTION OF EMBODIMENTS

The technical solution in embodiments of the present invention will be clearly described below in combination with the drawings in the embodiments of the present invention. Obviously, the described embodiments are only part of embodiments of the present invention but not all of them. All of other embodiments obtained by those of ordinary skill in the art based on the embodiments in the present invention without any creative effort fall within the protection scope of the present invention.

Figure 1:
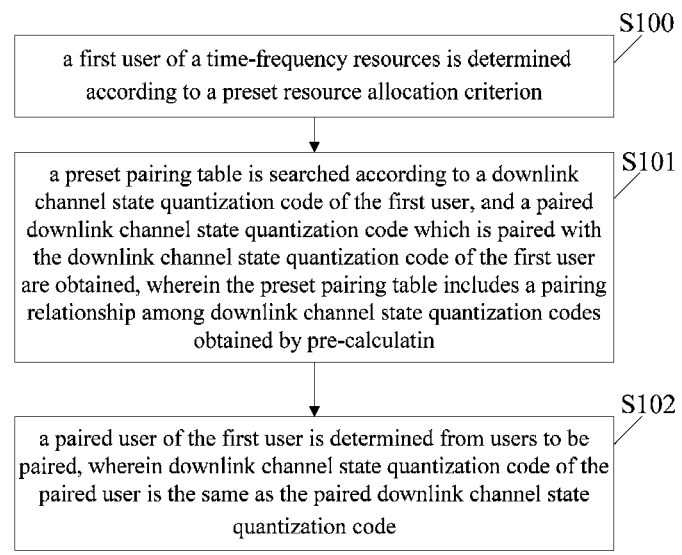
FIG. 1 is a flowchart of a first embodiment of a user pairing method for realizing user scheduling provided by the present invention.

Please refer to FIG. 1, which is a flowchart of a first embodiment of a user pairing method for realizing user scheduling provided by the present invention, comprising following steps.

in step S100, a first user of a time-frequency resources is determined according to a preset resource allocation criterion. Specifically, a corresponding user (also called as a first user) may be allocated for each time-frequency resource according to a priority and/or quality of service (QoS) of each user terminal. For example, the user with a highest priority is selected as the first user for one time-frequency resource.

In step S101, a preset pairing table is searched according to a downlink channel state quantization code of the first user, and a paired downlink channel state quantization code which is paired with the downlink channel state quantization code of the first user are obtained, wherein the preset pairing table includes a pairing relationship among downlink channel state quantization codes obtained by pre-calculating.

Wherein, a downlink channel state quantization code may be a quantization code searched out from a preset quantization code table according to a preset quantization criterion, and quantization codes included in the quantization code table are obtained by pre-sampling downlink channel state information. The downlink channel state information may include a beam-forming vector, a downlink channel matrix, a downlink channel column vector obtained by sequentially arranging elements of a downlink channel matrix according to the row or column of the downlink channel matrix, a main characteristic vector of a downlink channel matrix and the like. Since the downlink channel state information may include infinite samples, the downlink channel state information may be sampled at first to obtain the quantization code table with finite samples, which making the configuration of the pairing table convenient. Moreover, the pairing relationship among the downlink channel state quantization codes in the pairing table may be a pairing mode with the optimal or approximately optimal performance, which is pre-acquired by means of theoretical calculation, simulation analysis, prototype verification or the like, in order that the paired user paired with the first user is directly found according to the downlink channel state quantization codes of the first user during real-time communication, thereby obtaining a optimal or approximately optimal communication performance.

Preferably, the pairing table may include a pairing relationship among downlink channel state quantization codes in various multi-user multiplexed stream numbers, which are obtained by pre-calculating. For example, when the number of multi-user multiplexed streams is 4, the pairing table includes a group of paired downlink channel state quantization codes (which are the downlink channel state quantization codes of a second user, a third user and a fourth user respectively) paired with the downlink channel state quantization codes of the first user.

In step S102, a paired user of the first user is determined from users to be paired, wherein downlink channel state quantization code of the paired user is the same as the paired downlink channel state quantization code. Those skilled in the art may understand that the selected paired user may be one or more users.

Specifically, the step S102 may include: pairable users are selected from the users to be paired, wherein downlink channel state quantization codes of the pairable users are the same as the paired downlink channel state quantization code; the pairable user with the highest priority is determined to be the paired user. For example, for one paired downlink channel state quantization code in one group of pairing downlink channel state quantization codes, if the downlink channel state quantization codes of a plurality of users to be paired are the same as the paired downlink channel state quantization code, that is, there are a plurality of pairable users, the pairable user with the highest priority may be selected to be the paired user.

Through presetting the pairing table including the pairing relationship among the downlink channel state quantization codes, and then selecting, according to the instantaneous downlink channel state quantization code, a paired user paired with the first user for each time-frequency resource in the pairing table during communication, the user pairing method for realizing user scheduling provided by the embodiments of the present invention can reduce complexity and calculation amount of a real-time calculation, reduce a time-delay, and improve the performance of the communication system.

Figure 2:
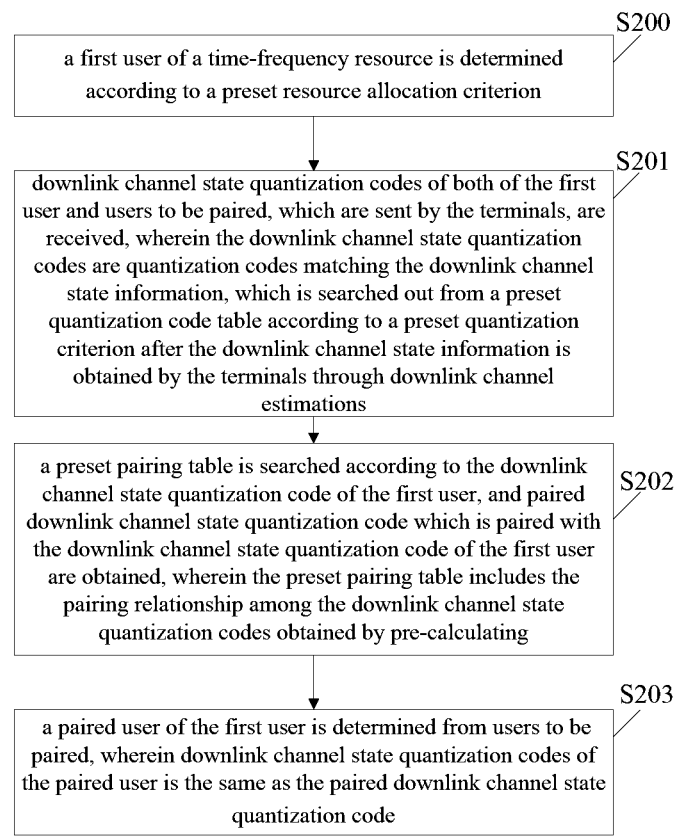
FIG. 2 is a flowchart of a second embodiment of the user pairing method for realizing user scheduling provided by the present invention.

Please refer to FIG. 2, which is a flowchart of a second embodiment of the user pairing method for realizing user scheduling provided by the present invention, including the following steps.

In step S200, a first user of a time-frequency resource is determined according to a preset resource allocation criterion. Specifically, a corresponding user (also called as a first user) may be allocated for each time-frequency resource according to a priority and/or quality of service (QoS) of each user terminal. For example, the user with the highest priority is selected as the first user for one time-frequency resource.

In step S201, downlink channel state quantization codes of both of the first user and users to be paired, which are sent by the terminals, are received, wherein the downlink channel state quantization codes are quantization codes matching the downlink channel state information, which is searched out from a preset quantization code table according to a preset quantization criterion after the downlink channel state information is obtained by the terminals through downlink channel estimations. A downlink channel estimation is a process of obtaining a downlink channel state from downlink received data through estimation.

In step S202, a preset pairing table is searched according to the downlink channel state quantization code of the first user, and paired downlink channel state quantization code which is paired with the downlink channel state quantization code of the first user are obtained, wherein the preset pairing table includes the pairing relationship among the downlink channel state quantization codes obtained by pre-calculating.

In step S203, a paired user of the first user is determined from users to be paired, wherein downlink channel state quantization codes of the paired user is the same as the paired downlink channel state quantization code.

Figure 3:
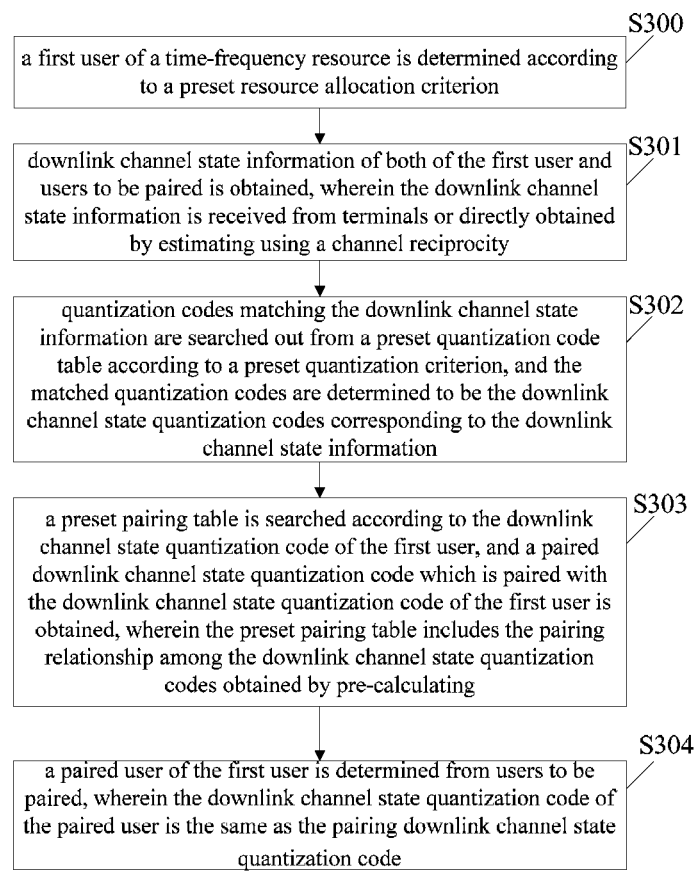
FIG. 3 is a flowchart of a third embodiment of the user pairing method for realizing user scheduling provided by the present invention.

Please refer to FIG. 3, which is a flowchart of a third embodiment of the user pairing method for realizing user scheduling provided by the present invention, including the following steps.

In step S300, a first user of a time-frequency resource is determined according to a preset resource allocation criterion. Specifically, a corresponding user (also called as the first user) may be allocated for each time-frequency resource according to a priority and/or quality of service (QoS) of each user terminal. For example, the user with the highest priority is selected as the first user for one time-frequency resource.

In step S301, downlink channel state information of both of the first user and users to be paired is obtained, wherein the downlink channel state information is received from terminals or directly obtained by estimating using a channel reciprocity. In an FDD mode, downlink channel state information may be received from terminals. In a TDD mode, downlink channel state information may be received from terminals, or an uplink channel state may be directly obtained through uplink channel estimation and then the downlink channel state information may be obtained according to a channel reciprocity principle.

In step S302, quantization codes matching the downlink channel state information are searched out from a preset quantization code table according to a preset quantization criterion, and the matched quantization codes are determined to be the downlink channel state quantization codes corresponding to the downlink channel state information.

In step S303, a preset pairing table is searched according to the downlink channel state quantization code of the first user, and a paired downlink channel state quantization code which is paired with the downlink channel state quantization code of the first user is obtained, wherein the preset pairing table includes the pairing relationship among the downlink channel state quantization codes obtained by pre-calculating.

In step S304, a paired user of the first user is determined from users to be paired, wherein the downlink channel state quantization code of the paired user is the same as the pairing downlink channel state quantization code.

Preferably, in the embodiments shown in FIG. 1 to FIG. 3, the quantization code table may be pre-obtained after performing moderate balance between performance and calculation amount by means of theoretical calculation, simulation analysis, prototype verification or the like. For example, the quantization code table may be obtained by sampling all possible downlink channel state information, and the quantization code table obtained after sampling is capable of optimally representing all the possible downlink channel state information. That is, the preset quantization code table represents all possible downlink channel state information samples by a finite number of quantization codes. When there is a large number of the quantization codes included in the quantization code table, the quantization result is more accurate, the system performance is better, but the calculation amount is enormous. When there is a small number of the quantization codes included in the quantization code table, the calculation amount is relatively low, but the quantization result error is high, which will influence a system performance. Therefore, a balance needs to be performed between the performance and the calculation amount according to an analyzing and testing result.

Preferably, in the embodiments shown in FIG. 1 to FIG. 3, the downlink channel state information may be a downlink space vector used for representing a downlink channel state. The downlink space vector may be a downlink channel column vector obtained by sequentially arranging elements of a downlink channel matrix according to the row or column of the downlink channel matrix, or the downlink space vector may be a downlink main characteristic vector obtained after performing singular value decomposition on a correlation matrix of the downlink channel matrix. Suppose a base station is provided with N transmitting antennas, a terminals is provided with M receiving antennas, the channel response between every pair of receiving antenna and transmitting antenna is a flat fading, and a channel response between the $N^{th}$ transmitting antenna and the $M^{th}$ receiving antenna is represented as $h_{mn}$, then the downlink space channel matrix is represented as:

$$H = \begin{bmatrix} h_{11} & h_{12} & \ldots & h_{1N} \\ h_{21} & h_{22} & \ldots & h_{2N} \\ \vdots & \vdots & \ddots & \vdots \\ h_{M1} & h_{M2} & \ldots & h_{MN} \end{bmatrix}.$$

If a downlink channel response between a receiving antenna and a transmitting antenna is a frequency selective channel, the frequency selective channel may be converted to lots of sub-carriers by technologies such as an orthogonal frequency division multiplexing (OFDM) and the like. A channel on each sub-carrier is a flat channel, and a downlink channel matrix thereof may be represented by the formula above. The elements of the above-mentioned downlink channel matrix are sequentially arranged according to the row and converted to a downlink channel column vector $h=vec(H)=[h_{11}, h_{12}, \ldots, h_{21}, h_{22}, \ldots, h_{MN}]^T$, and the downlink channel column vector h is used for representing the downlink channel information. In a beam-forming technology, the downlink main characteristic vector may also be obtained as the downlink space vector. Wherein, a correlation matrix C of the downlink channel matrix H meets $C=H^H H$. A singular value decomposition (Singular value decomposition, SVD) is performed on the correlation matrix C, that is, $c=v\Sigma v^H$, to obtain $V^H=[v_1, v_2, \ldots v_N]$. The main characteristic vector (or called as a first characteristic vector)$_v$, corresponding to a main characteristic value (the maximum characteristic value) is obtained, and the downlink main characteristic vector $v_1=[v_1, v_2, \ldots v_N]^T$ is used for representing the downlink channel information. Correspondingly, quantization codes included in the quantization code table is a preset number of vectors. In order to further simplify a calculation, the selected quantization codes may also be normalized vectors, that is, the module value of the quantization codes is 1.

Preferably, in the embodiments shown in FIG. 1 to FIG. 3, the step that the quantization code matching the obtained downlink channel state information is searched out, according to the preset quantization criterion, from the preset quantization code table, specifically includes: a correlation between the downlink space vector and each quantization code in the quantization code table is sequentially calculated according to a first quantization formula $$\rho_k = \frac{|w^H c_k|}{|w||c_k|};$$

the quantization code with a maximum correlation is identified as the downlink channel state quantization code corresponding to the downlink space vector, wherein $\rho_k$ represents a correlation between the downlink space vector and a $k^{th}$ quantization code in the quantization code table, w represents the downlink space vector, $w^H$ represents a conjugate transpose of w, and $c_k$ represents the $k^{th}$ quantization code in the quantization code table. Correspondingly, when a setting the pairing table, the pairing relationship may be determined according to the correlation among the downlink channel state quantization codes. For example, if the number of multi-user multiplexed streams is 2, then the correlation between the two paired downlink channel state quantization codes in the pairing table is in minimum; and if the number of multi-user multiplexed streams is greater than 2, then the sum of the correlations between every two of the paired downlink channel state quantization codes in the pairing table is in minimum.

Preferably, in the embodiments shown in FIG. 1 to FIG. 3, the step that the quantization codes matching the obtained downlink channel state information are searched out from the preset quantization code table according to the preset quantization criterion, specifically includes: the Euclidean distance between the downlink space vector and each quantization code in the quantization code table is sequentially calculated according to a second quantization formula $$d_k = \left\| \frac{w}{|w|} - \frac{c_k}{|c_k|} \right\|,$$

the quantization code with the minimum Euclidean distance is identified as the downlink channel state quantization code corresponding to the downlink space vector, wherein $d_k$ represents an Euclidean distance between the downlink space vector and a $k^{th}$ quantization code in the quantization code table, w represents the downlink space vector, and $c_k$ represents the $k^{th}$ quantization code in the quantization code table. Correspondingly, when setting a pairing table, the pairing relationship may be determined according to the Euclidean distances among the downlink channel state quantization codes. For example, if the number of multi-user multiplexed streams is 2, then the Euclidean distance between two paired downlink channel state quantization codes in the pairing table is in maximum; and if the number of multi-user multiplexed streams is greater than 2, then the sum of the Euclidean distance between every two of the paired downlink channel state quantization codes in the pairing table is in maximum.

Preferably, in the embodiments shown in FIG. 1 to FIG. 3, in order to simplify processes of calculation and transmission, a serial number may be allocated to each quantization code in the quantization code table, and a downlink channel state quantization code in the pairing table may be represented by the corresponding serial number.

In order to illustrate the present invention better, a specific embodiment will be illustrated below. Suppose the antennas of a multi-antenna system are configured to be 4T1R (four transmitting antennas and one receiving antenna), then a downlink channel column vector is a four-dimensional complex vector $h=[h_1, h_2, h_3, h_4]^T$. Suppose all the four transmitting antennas independently fade and are adequate in multi-path reflection in a wireless channel space, then each element in the downlink channel column vector may be considered to be a random variable with complex Gaussian distribution. Therefore the downlink channel column vector has infinite samples. In comprehensive consideration of a system performance and calculation amount, a four-dimensional space quantization code table with 16 quantization codes is selected, wherein each quantization code is a normalized vector, that is, the module value of the vector is 1. The quantization code table is shown in table 1 below:

TABLE 1

| Serial number | Quantization code | | | |
|---|---|---|---|---|
| 1 | −0.5053 − 0.1142i | 0.0564 − 0.2637i | −0.0147 − 0.4594i | 0.3031 − 0.5965i |
| 2 | −0.1399 + 0.5105i | −0.1582 + 0.3100i | 0.1570 + 0.1031i | 0.5854 − 0.4698i |
| 3 | 0.0873 − 0.0177i | 0.1606 − 0.4157i | 0.4865 − 0.5567i | −0.2784 − 0.4116i |
| 4 | −0.2946 + 0.2196i | −0.3805 + 0.2332i | −0.5536 − 0.5401i | 0.1834 + 0.1847i |
| 5 | −0.0110 − 0.3120i | −0.7804 − 0.3082i | −0.2709 + 0.515i | 0.2920 − 0.1928i |
| 6 | −0.2343 + 0.1924i | 0.6516 − 0.4244i | −0.3757 − 0.2992i | 0.2583 − 0.7222i |
| 7 | −0.0192 + 0.2004i | −0.2084 + 0.2441i | 0.2372 − 0.5273i | 0.0019 − 0.7226i |
| 8 | −0.8276 − 0.3413i | −0.0008 + 0.0687i | 0.1443 + 0.2538i | −0.1822 + 0.2745i |
| 9 | 0.0824 − 0.5244i | 0.2931 − 0.4324i | −0.3895 + 0.3197i | 0.3898 − 0.1989i |
| 10 | 0.1392 − 0.8059i | −0.1072 + 0.0522i | 0.4159 + 0.0747i | 0.0172 − 0.3717i |
| 11 | −0.0757 − 0.7601i | 0.0596 − 0.0324i | −0.3387 − 0.3082i | 0.1353 + 0.4287i |
| 12 | 0.5027 − 0.1338i | −0.3499 + 0.0284i | −0.4993 + 0.2628i | −0.5008 − 0.1922i |
| 13 | −0.0960 − 0.1991i | 0.0755 + 0.0992i | −0.4965 − 0.7120i | 0.4265 − 0.0184i |
| 14 | −0.5195 + 0.0304i | 0.4125 + 0.2401i | 0.0452 − 0.0436i | −0.7028 − 0.0593i |
| 15 | −0.0948 − 0.1660i | −0.0137 − 0.8064i | 0.0706 + 0.0402i | −0.5100 − 0.2150i |
| 16 | 0.0717 + 0.3332i | −0.5284 − 0.6356i | 0.3956 − 0.0391i | 0.0685 + 0.1949i |

A correlation between the $i^{th}$ quantization code and the $j^{th}$ quantization code is calculated according to a correlation calculation formula $$\rho(i,j) = \frac{|c_i^H c_j|}{|c_i||c_j|}.$$

Figure 4:
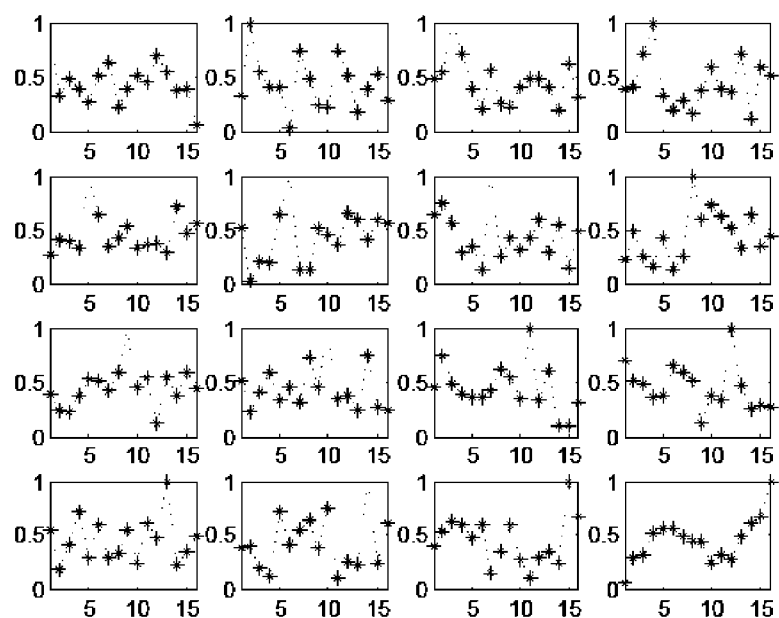
FIG. 4 is a schematic diagram of calculated results of correlation among various quantization codes in a quantization code table shown in table 1.

Since the quantization codes are all normalized vectors, that is, $|c_k|=1$, therefore the correlation calculation formula may be simplified to $\rho(i,j)=|c_i^H c_j|$. The calculation result of the correlation between every two quantization codes in Table 1 is shown in FIG. 4. In FIG. 4, different boxes represent the correlations (the serial numbers are arranged according to a longitudinal direction following a horizontal direction) between the different quantization codes and other quantization codes, the horizontal axis of each box represents the serial number of each quantization code, and the longitudinal axis represents the correlation magnitude (0-1). For example, the first box represents the correlation between the quantization code with the serial number of 1 and all the other quantization codes, the correlation is 1 when the serial number is 1 which represents self-correlation, and the correlation with the quantization code corresponding to the serial number of 16 is in minimum.

When setting pairing table, for the pairing table of which the number of multi-user multiplexed streams is 2, a downlink channel state quantization code with the minimum correlation is selected to pair, which is specifically shown in table 2 below:

TABLE 2

| U user | V user 1 | V user 2 |
|--------|----------|----------|
| 1      | 16       | 8        |
| 2      | 6        | 13       |
| 3      | 14       | 6        |
| 4      | 14       | 8        |
| 5      | 1        | 13       |
| 6      | 2        | 7        |
| 7      | 6        | 15       |
| 8      | 6        | 4        |
| 9      | 12       | 3        |
| 10     | 2        | 16       |
| 11     | 15       | 14       |
| 12     | 9        | 14       |
| 13     | 2        | 14       |
| 14     | 11       | 4        |
| 15     | 11       | 7        |
| 16     | 1        | 10       |

Wherein, the column of quantization code serial numbers corresponding to "U user" is the downlink channel state quantization code serial numbers of the first user, the column of quantization code serial numbers corresponding to "V user 1" is the downlink channel state quantization code serial numbers of the most optimal paired user, and the column of quantization code serial numbers corresponding to "V user 2" is the downlink channel state quantization code serial numbers of the suboptimal paired user.

For the pairing table of which the number of multi-user multiplexed streams is 4, a group of downlink channel state quantization codes with the minimum sum of correlations between each two therein is selected to pair, which is specifically shown in table 3 below:

TABLE 3

| 1  | 4  | 6  | 8  |
|----|----|----|----|
| 2  | 4  | 8  | 6  |
| 3  | 6  | 7  | 8  |
| 4  | 6  | 7  | 8  |
| 5  | 2  | 10 | 13 |
| 6  | 4  | 7  | 8  |
| 7  | 4  | 6  | 8  |
| 8  | 7  | 4  | 6  |
| 9  | 12 | 4  | 14 |
| 10 | 7  | 11 | 15 |
| 11 | 12 | 14 | 15 |
| 12 | 11 | 14 | 15 |
| 13 | 7  | 10 | 15 |
| 14 | 11 | 12 | 15 |

TABLE 3-continued

| 15 | 11 | 12 | 14 |
|----|----|----|----|
| 16 | 2  | 10 | 13 |

Wherein, the first column of the quantization code serial numbers is the downlink channel state quantization code serial numbers of the first user, and the second to fourth columns of the quantization code serial numbers are the groups of the downlink channel state quantization code serial numbers of the most optimal paired user group.

A real-time communication may be performed after the quantization code table and the pairing table are preset through the above-mentioned way. For example, during the real-time communication, an instantaneous downlink channel column vector of the first user for a certain time-frequency resource is determined to be $h=[-0.6914 -0.3785i, -1.1122-0.1852i, -0.2618-0.7746i, -0.1564+0.3884i]^T$. A corresponding downlink channel state quantization code serial number of the first user obtained after performing, by virtue of a method referring to the descriptions of FIG. 2 and FIG. 3, quantization matching on the instantaneous downlink channel column vector of the first user according to the quantization code table shown in table 1 is 4. Then the pairing table is searched. When the number of multi-user multiplexed streams is 2, the paired downlink channel state quantization code is 14 or 8; and when the number of multi-user multiplexed streams is 4, the paired downlink channel state quantization code group is (6, 7, 8). A user with the above-mentioned paired downlink channel state quantization code is selected as the paired user according to the result of performing quantization matching on the instantaneous downlink channel column vectors of the users to be paired.

Figure 5:
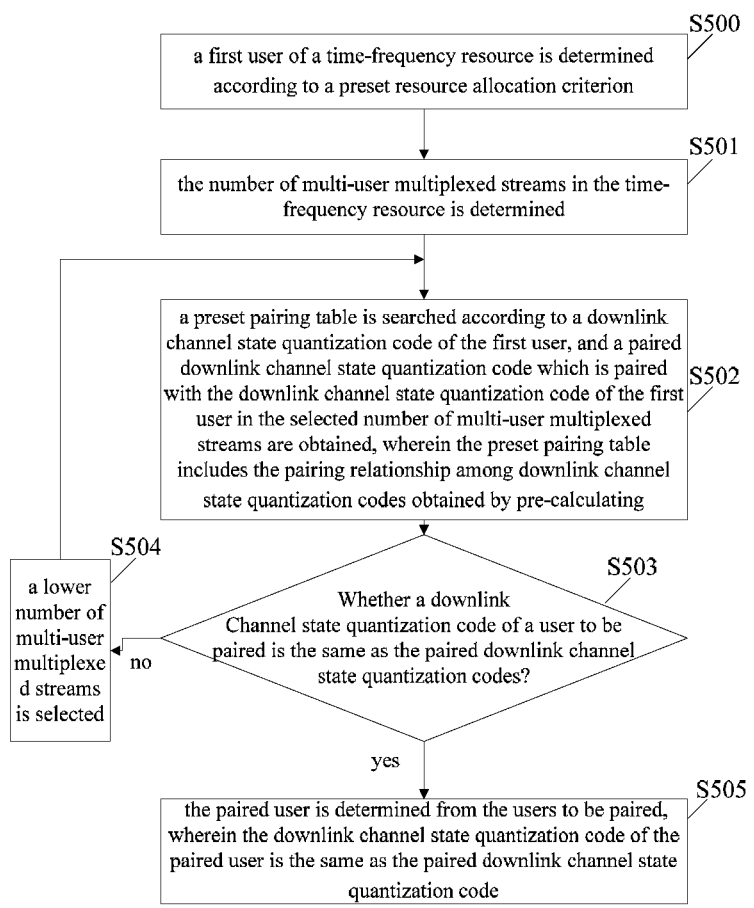
FIG. 5 is a flowchart of a fourth embodiment of the user pairing method for realizing user scheduling provided by the present invention.

Referring to FIG. 5, which is a flowchart of a fourth embodiment of the user pairing method for realizing user scheduling provided by the present invention, including the following steps.

In step S500, a first user of a time-frequency resource is determined according to a preset resource allocation criterion.

In step S501, the number of multi-user multiplexed streams in the time-frequency resource is determined.

In step S502, a preset pairing table is searched according to a downlink channel state quantization code of the first user, and a paired downlink channel state quantization code which is paired with the downlink channel state quantization code of the first user in the selected number of multi-user multiplexed streams are obtained, wherein the preset pairing table includes the pairing relationship among downlink channel state quantization codes obtained by pre-calculating.

In step S503, whether a downlink channel state quantization code of a user to be paired is the same as the paired downlink channel state quantization codes is determined.

If the determination result of the step S503 is no, step S504 is executed. In step S504, a lower number of multi-user multiplexed streams is selected. Since the maximum number of multi-user multiplexed streams supported by one time-frequency resource is related to the number of antennas of the receiving end and the transmitting end, and if the number of multi-user multiplexed streams is increased, the support of hardware may not be ensured obviously, the number of multi-user multiplexed streams is usually reduced when a pairing fails. Then the step S502 is re-executed. In addition, if there is a suboptimal pairing relationship (for example, the V user 2 shown in Table 2) in the pairing table, then suboptimal pairing may also be selected when the most optimal pairing fails.

If the determination result of the step S503 is yes, then the step S505 is executed. In step S505, the paired user is determined from the users to be paired, wherein the downlink channel state quantization code of the paired user is the same as the paired downlink channel state quantization code.

Figure 6:
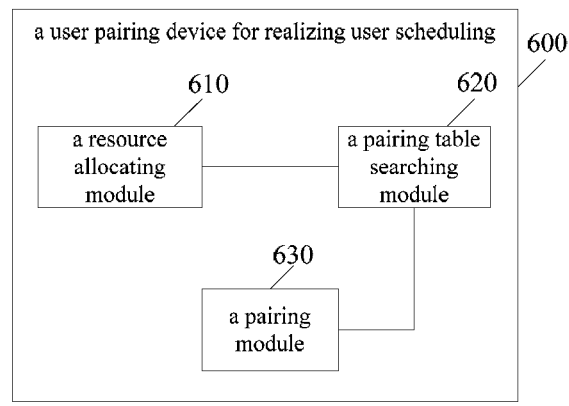
FIG. 6 is a structural schematic diagram of a first embodiment of a user pairing device for realizing user scheduling provided by the present invention.

Referring to FIG. 6, which is a structural schematic diagram of a first embodiment of a user pairing device for realizing user scheduling provided by the present invention. The user pairing device 600 for realizing user scheduling may be used for executing the method shown in FIG. 1, including:

a resource allocating module 610, configured to determine a first user of a time-frequency resource according to a preset resource allocation criterion;

a pairing table searching module 620, configured to search a preset pairing table according to downlink channel state quantization code of the first user, and obtain a paired downlink channel state quantization code which is paired with the downlink channel state quantization code of the first user, wherein the preset pairing table includes a pairing relationship among downlink channel state quantization codes obtained by pre-calculating; and a pairing module 630 configured to determine a paired user of the first user from users to be paired, the downlink channel state quantization code of the paired user is the same as the paired downlink channel state quantization code.

Figure 7:
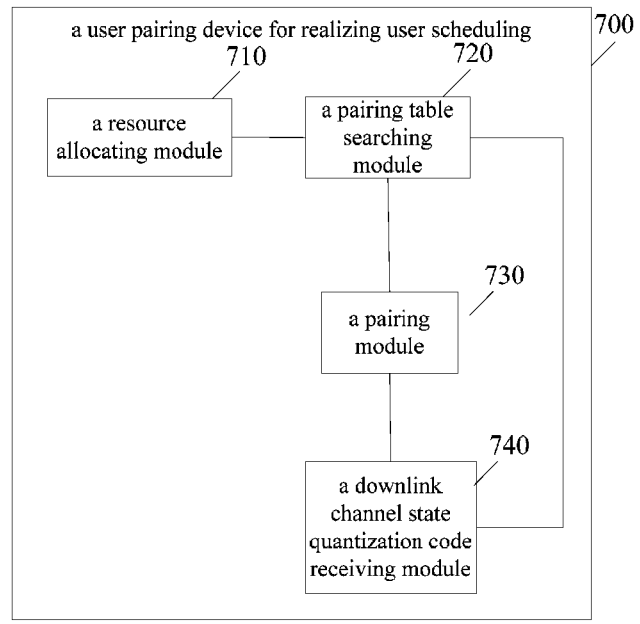
FIG. 7 is a structural schematic diagram of a second embodiment of the user pairing device for realizing user scheduling provided by the present invention.

A user pairing device 700 for realizing user scheduling, shown in FIG. 7, may be used for executing the method shown in FIG. 2, including a resource allocating module 710, a pairing table searching module 720, a pairing module 730 and a downlink channel state quantization code receiving module 740. Wherein, the resource allocating module 710, the pairing table searching module 720 and the pairing module 730 are similar to the resource allocating module 610, the pairing table searching module 620 and the pairing module 630 respectively.

The downlink channel state quantization code receiving module 740 is used for receiving downlink channel state quantization codes sent by terminals, and the downlink channel state quantization codes are quantization codes matching the downlink channel state information and searched out from a preset quantization code table according to a preset quantization criterion after the downlink channel state information is obtained by the terminals through downlink channel estimations. The downlink channel state quantization code of the first user used by the pairing table searching module 720 and the downlink channel state quantization code of users to be paired used by the pairing module 730 are all received by the downlink channel state quantization code receiving module 740 from the terminals.

Figure 8:
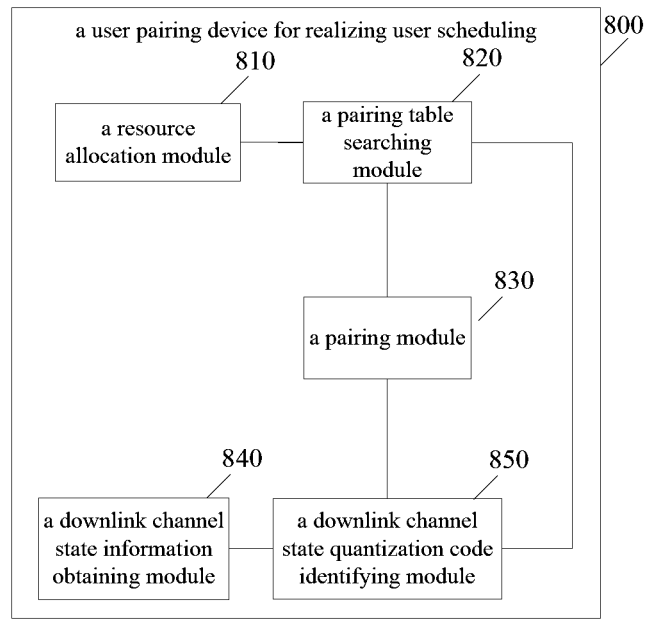
FIG. 8 is a structural schematic diagram of a third embodiment of the user pairing device for realizing user scheduling provided by the present invention.

A user pairing device 800 for realizing user scheduling, shown in FIG. 8, may be used for executing the method shown in FIG. 3, including a resource allocation module 810, a pairing table searching module 820, a pairing module 830, a downlink channel state information obtaining module 840 and a downlink channel state quantization code identifying module 850. Wherein, the resource allocating module 810, the pairing table searching module 820 and the pairing module 830 are similar to the resource allocating module 610, the pairing table searching module 620 and the pairing module 630 respectively.

The downlink channel state information obtaining module 840 is configured to acquire the downlink channel state information of the users, and the downlink channel state information is received from the terminals or directly obtained by estimating using a channel reciprocity.

The downlink channel state quantization code identifying module 850 is configured to search quantization codes matching the downlink channel state information from a preset quantization code table according to a preset quantization criterion, and determine the matched quantization codes to be the downlink channel state quantization code corresponding to the downlink channel state information. The downlink channel state quantization code of the first user used by the pairing table searching module 820 and the downlink channel state quantization codes of the users to be paired used by the pairing module 830 are all calculated by the downlink channel state quantization code identifying module 850 according to the downlink channel state information obtained by the downlink channel state information obtaining module 840.

Figure 9:
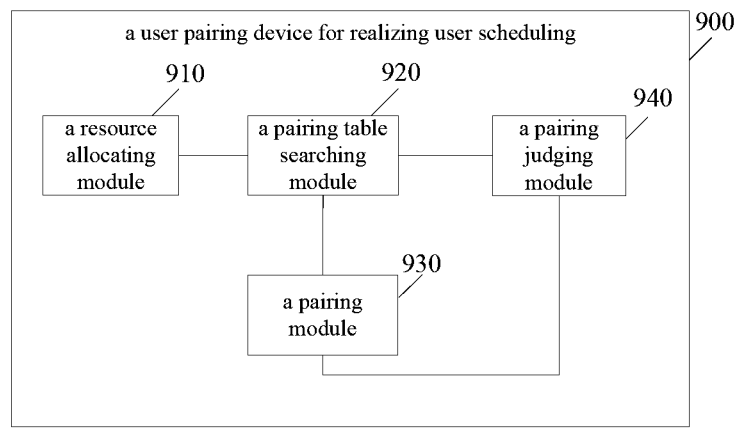
FIG. 9 is a structural schematic diagram of a fourth embodiment of the user pairing device for realizing user scheduling provided by the present invention.

The user pairing device 900 for realizing user scheduling, shown in FIG. 9, may be used for executing the method shown in FIG. 5, including a resource allocating module 910, a pairing table searching module 920, a pairing module 930 and a pairing judging module 940. The resource allocating module 910, the pairing table searching module 920 and the pairing module 930 are similar to the resource allocating module 610, the pairing table searching module 620 and the pairing module 630 respectively.

The pairing judging module 940 is configured to judge whether a downlink channel state quantization code of a user to be paired are the same as the paired downlink channel state quantization code. If the result is no, the pairing table searching module 920 is notified to select a lower number of multi-user multiplexed streams, search the preset pairing table according to the downlink channel state quantization code of the first user, and obtain the paired downlink channel state quantization code which is paired with the downlink channel state quantization code of the first user in the selected number of multi-user multiplexed streams. If the judged result of the pairing judging module 940 is yes, then the pairing module 930 is notified to identify the pairing user.

An embodiment of the present invention further disclose a base station, and the base station may include any one user pairing device for realizing user scheduling provided by the embodiments of the present invention.

Figure 10:
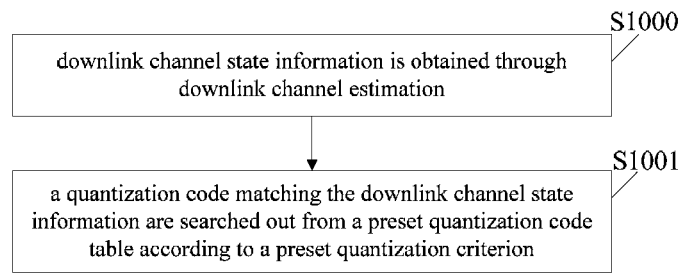
FIG. 10 is a flowchart of a first embodiment of a method for acquiring downlink channel state quantization codes provided by the present invention.

An embodiment of the present invention further disclose a method for obtaining a downlink channel state quantization code, as shown in FIG. 10, including the following steps. S1000, downlink channel state information is obtained through downlink channel estimation. S1001, a quantization code matching the downlink channel state information are searched out from a preset quantization code table according to a preset quantization criterion. The method is executed by terminals, the terminals obtain the downlink channel state quantization code and then transmit the downlink channel state quantization code to the base station. For the realization process, reference may be made to an above-mentioned embodiment of the present invention, which is not redundantly described herein.

Figure 11:
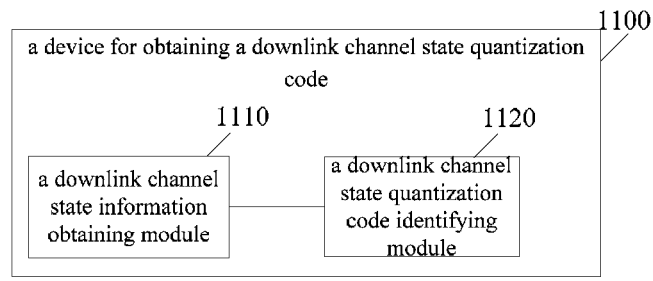
FIG. 11 is a structural schematic diagram of a first embodiment of a device for acquiring downlink channel state quantization codes provided by the present invention.

An embodiment of the present invention further discloses a device for obtaining a downlink channel state quantization code. As shown in FIG. 11 the device 1100 includes: a downlink channel state information obtaining module 1110, configured to obtain downlink channel state information through downlink channel estimation; and a downlink channel state quantization code identifying module 1120, configured to search a quantization codes matching the downlink channel state information by searching a preset quantization code table according to a preset quantization criterion. The device may be independently realized as a transmitting terminal, or may be realized as software integrated in a terminal such as a mobile phone and the like, or may be realized by hardware, that is, a logical circuit.

Figure 12:
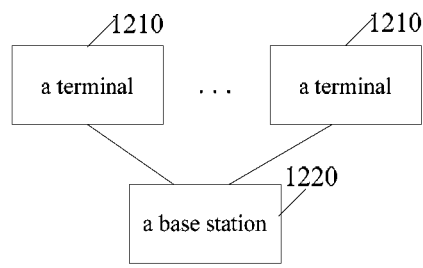
FIG. 12 is a schematic diagram of a user pairing system for realizing user scheduling provided by the present invention.

An embodiment of the present invention further discloses a user pairing system for realizing user scheduling. As shown in FIG. 12, the system includes a plurality of terminals 1210 and a base station 1220.

In an embodiment, the terminals 1210 are configured to: send downlink channel state quantization codes to the base station, wherein the downlink channel state quantization codes are quantization codes matching the downlink channel state information, which is searched from a preset quantization code table according to a preset quantization criterion after the downlink channel state information is obtained by the terminals through downlink channel estimations. The base station 1220 is configured to: determine a first user of a time-frequency resource according to the preset resource allocation criterion; receive the downlink channel state quantization codes sent by the terminals, and determine a downlink channel state quantization code of the first user from the received downlink channel state quantization codes; search a preset pairing table according to the downlink channel state quantization code of the first user to obtain a paired downlink channel state quantization code which is paired with the downlink channel state quantization code of the first user, wherein the preset pairing table includes a pairing relationship among the downlink channel state quantization codes obtained by pre-calculating; and determine a paired user of the first user from users to be paired, wherein the downlink channel state quantization code of the paired user is the same as the paired downlink channel state quantization code. In another embodiment, the terminals 1210 are configured to: sending downlink channel state information to the base station, wherein the downlink channel state information is a downlink space vector used for representing a downlink channel state. The base station 1220 is configured to: determine a first user of a time-frequency resource according to the preset resource allocation criterion; receive the downlink channel state information sent by the terminals; search quantization codes matching the obtained downlink channel state information by searching from a preset quantization code table according to a preset quantization criterion to identify the matched quantization codes as the downlink channel state quantization codes corresponding to the downlink channel state information; determine the downlink channel state quantization code of the first user from the downlink channel state quantization codes; search a preset pairing table according to the downlink channel state quantization code of the first user to acquire a paired downlink channel state quantization code which is paired with the downlink channel state quantization code of the first user, wherein the preset pairing table includes a pairing relationship among the downlink channel state quantization codes obtained by pre-calculating; and identify a paired user of the first user from users to be paired, wherein the downlink channel state quantization code of the paired user is the same as the paired downlink channel state quantization codes.

It should be understood that, in the embodiment of the present invention, one terminal 1210 is corresponding to one user (the user is not necessarily an invariable user), a plurality of terminals send the downlink channel state quantization codes of the respective users to the base station. In an implementation, the downlink channel state quantization code sent by a user include a user identification (or a terminal identification), the base station may identify which user the downlink channel state quantization code belong to according to the user identification, and identification for the downlink channel state information may also be performed in the same way. The technology is not the emphasis of the present invention, and therefore is not described redundantly herein.

It should be noted that, a specific implementation of the terminals 1210 and the base station 1220 may be as shown in an above embodiment of the present invention, which will not described redundantly herein. In addition, a terminal in an embodiment of the present invention may be a computer, a notebook, a mobile phone, a handheld computer, a personal digital assistant (Personal Digital Assistant, PDA) and the like.

Those of ordinary skill in the art may understand that all or part of flows for realizing the above-mentioned embodiment methods may be completed by program instruction-related hardware. The foregoing program may be stored in a computer readable storage medium. When being executed, the program may include the flows of the embodiments of the above-mentioned methods. Wherein, the storage medium may be disk, optical disk, read-only memory (Read-Only Memory, ROM), random access memory (Random Access Memory, RAM) or the like.

The foregoing descriptions are merely a preferred embodiment of the present invention, but the protection scope of the present invention is not limited thereto. Those of ordinary skill in the art should understand that realization for all or part of flows in the above-mentioned embodiments and the equivalent variations made according to the claims of the present invention are still encompassed in the scope of the present invention.

What is claimed is:

1. A user pairing method for realizing user scheduling, the method comprising:
   determining according to a preset resource allocation criterion, a first user of a time-frequency resource;
   obtaining downlink channel state information of both of the first user and one or more other users to be paired, wherein the downlink channel state information (a) is received from terminals or directly obtained by estimating user channel reciprocity and (b) is a downlink space vector used for representing a state of a downlink channel;
   searching, according to a preset quantization criterion, quantization codes matching the downlink channel state information from a table of preset quantization codes obtained by sampling the downlink channel state information, the searching including;
   a) sequentially calculating according to a first quantization formula $$\rho_k = \frac{|w^H c_k|}{|w||c_k|},$$

a correlation between the downlink space vector and each quantization code in the table and
   b) identifying a quantization code with a highest correlation as a downlink channel state quantization code corresponding to a downlink space vector, wherein $\rho_k$ represents a correlation between the downlink space vector and a $k^{th}$ quantization code in the table, w represents the downlink space vector, $w^H$ represents a conjugate transpose of w, and $c_k$ represents the $k^{th}$ quantization code in the table;

identifying the matched quantization codes as downlink channel state quantization codes corresponding to the downlink channel state information;

searching, according to a downlink channel state quantization code of the first user, a preset pairing table to obtain a paired downlink channel state quantization code which is paired with the downlink channel state quantization code of the first user, wherein the preset pairing table includes a pairing relationship among downlink channel state quantization codes obtained by pre-calculating; and determining a paired user of the first user from at least one user to be paired, wherein a downlink channel state quantization code of the paired user is the same as the paired downlink channel state quantization code, wherein the downlink channel state quantization code is a quantization code obtained by searching the table of preset quantization codes according to a preset quantization criterion.

2. The method of claim 1, wherein determining the paired user from the at least one user to be paired comprises:
selecting pairable users from the users to be paired, wherein downlink channel state quantization codes of the pairable users are the same as the paired downlink channel state quantization code; and
identifying a pairable user with a highest priority as the paired user.

3. A user pairing device for realizing user scheduling, the device comprising:
a non-transitory storage medium configured to store program instructions;
a processor configured to execute the program instructions, so as to provide the following:
determine, according to a preset resource allocation criterion, a first user of a time-frequency resource;
search, according to a downlink channel state quantization code of the first user, a preset pairing table to obtain a paired downlink channel state quantization code which is paired with the downlink channel state quantization code of the first user, wherein the preset pairing table includes a pairing relationship among downlink channel state quantization codes obtained by pre-calculating;

determine a paired user of the first user from at least one user to be paired, wherein a downlink channel state quantization code of the paired user is the same as the paired downlink channel state quantization code;

obtain downlink channel state information of both of the first user and the at least one other user to be paired,
wherein the downlink channel state information (a) is received from terminals or directly obtained by estimating using channel reciprocity and (b) is a downlink space vector used for representing a downlink channel state;

search, according to the preset quantization criterion, quantization codes matching the downlink channel state information from the table;

identify the matched quantization codes as the downlink channel state quantization codes corresponding to the downlink channel state information;

sequentially calculate, according to a first quantization formula $$\rho_k = \frac{|w^H c_k|}{|w||c_k|},$$

a correlation between the downlink space vector and each quantization code in the table, wherein $\rho_k$ represents a correlation between the downlink space vector and a $k^{th}$ quantization code in table, w represents the downlink space vector, $w^H$ represents a conjugate transpose of w, and $c_k$ represents the $k^{th}$ quantization code in the table; and identify a quantization code with a highest correlation as the downlink channel state quantization code corresponding to the downlink space vector.

4. The device of claim 3, wherein the processor is further configured to:
select pairable users from the users to be paired, wherein downlink channel state quantization codes of the pairable users are the same as the paired downlink channel state quantization codes; and
identify a pairable user with the highest priority as the paired user.

* * * * *